United States Patent
Hosokawa

(10) Patent No.: US 7,852,329 B2
(45) Date of Patent: Dec. 14, 2010

(54) IMAGE DISPLAY APPARATUS

(75) Inventor: Takeshi Hosokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 938 days.

(21) Appl. No.: 11/688,561

(22) Filed: Mar. 20, 2007

(65) Prior Publication Data
US 2007/0229774 A1 Oct. 4, 2007

(30) Foreign Application Priority Data
Mar. 28, 2006 (JP) ............................. 2006-088301

(51) Int. Cl.
G09G 5/00 (2006.01)
G06F 3/038 (2006.01)

(52) U.S. Cl. ...................... 345/204; 345/84; 345/88; 353/53; 353/69; 359/234; 359/246

(58) Field of Classification Search .................. 345/84, 345/87, 8, 99, 102, 112, 117, 141, 201, 204, 345/211–214, 698, 699; 353/53, 69; 359/234, 359/246
See application file for complete search history.

(56) References Cited

U.S. PATENT DOCUMENTS

| 6,377,275 | B1 * | 4/2002 | Kim | 345/618 |
|---|---|---|---|---|
| 7,121,668 | B2 * | 10/2006 | De Vaan et al. | 353/69 |
| 7,277,093 | B2 * | 10/2007 | Kim | 345/211 |
| 7,453,475 | B2 * | 11/2008 | Nitta et al. | 345/690 |
| 2006/0055893 | A1 * | 3/2006 | Tseng et al. | 353/85 |
| 2009/0027623 | A1 * | 1/2009 | Kawamura et al. | 353/31 |

FOREIGN PATENT DOCUMENTS

JP A 11-288790 10/1999

* cited by examiner

Primary Examiner—Amare Mengistu
Assistant Examiner—Insa Sadio
(74) Attorney, Agent, or Firm—Oliff & Berridge, PLC

(57) ABSTRACT

An image display apparatus includes a light source that generates light-source light of a plurality of colors, at least one optical modulator that corresponds to the light source and modulates image light of each of the light-source light of the plurality of colors, a display drive unit that controls the operation of the optical modulator according to an input image signal to perform display, a signal determining unit that determines whether the image signal has been input and whether the image signal can be processed by the display drive unit, and determines that a display state is non-normal when the image signal has not been input or when the image signal cannot be processed by the display drive unit, and a controller that, when the signal determining unit determines that the display state is non-normal, generates only at least one specific color light of the light-source light of the plurality of colors and simultaneously transmits a display image signal for non-normal display to the optical modulator.

9 Claims, 7 Drawing Sheets

IMAGE DISPLAY APPARATUS

BACKGROUND

1. Technical Field

The present invention relates to an image display apparatus, such as a projector, in which, when any image signal is not input, a state in which any displayable signal is not being input is displayed.

2. Related Art

A technique in which, in an image display apparatus, such as a projector, lamp lighting is performed at a power less than a rated lamp power in order to reduce the power consumption in a non-normal display state, such as a case when any image signal is not being input, that is, a stand-by state when normal operation is performed but any signal is not being input (see JP-A-11-288790).

However, in this stand-by state, when lamp lighting is performed at a power less than a rated lamp power, the whole luminance may decrease and thus display may become dark. Also, in the stand-by state, for example, the background is generally displayed in a single color, for example, blue, and light within a wavelength range not used for display becomes useless

SUMMARY

An advantage of some aspects of the invention is that it provides an image display apparatus capable of maintaining the brightness of display while reducing power consumption in a non-normal display state, such as a case where any image signal is not being input.

According to a first aspect of the invention, an image display apparatus includes (a) a light source that generates light-source light of a plurality of colors, (b) at least one optical modulator that modulates each of the light-source light generated by the light source to image light, (c) a display drive unit that controls the optical modulator to perform display according to an input image signal, (d) a signal determining unit that determines whether the image signal has been input and whether the image signal can be processed by the display drive unit, and determines that a display state is non-normal when the image signal has not been input or when the image signal cannot be processed by the display drive unit, and (e) a controller that, when the signal determining unit determines that the display state is non-normal, controls the light source to generates only one specific color light of the plurality of colors and simultaneously transmits a display image signal for non-normal display to the optical modulator.

In the image display apparatus according to the first aspect, in the non-normal display state, such as a case when any image signal is not being input, the controller performs control to generate only at least one specific color light among the plurality of light-source light of the light source. Therefore, it is possible to ensure a display function necessary for non-normal display, and since only at least one specific color light among the plurality of light-source light is generated and unnecessary light-source light is prevented from generating, it is possible to reduce the power consumption of the image display apparatus.

According to a second aspect of the invention, an image display apparatus includes (a) a plurality of color light sources that generate light-source light of a plurality of colors, respectively, (b) a plurality of optical modulators that correspond to the respective color light sources and modulate each light-source light generated by the plurality of colors light sources to image light of the individual colors, (c) a light synthesizing unit that synthesizes the image light of the individual colors respectively modulated by the plurality of optical modulators, (d) a display drive unit that controls the optical modulators to perform display according to an input image signal, (e) a signal determining unit that determines whether the image signal has been input and whether the image signal can be processed by the display drive unit, and determines that a display state is non-normal when the image signal has not been input or when the image signal cannot be processed by the display drive unit, and (f) a controller that, when the signal determining unit determines that the display state is non-normal, turns on at least one of the color light sources as a light source that is turned on when non-normal display is performed, turns off the remaining color light sources as light sources that are turned off when non-normal display is performed, and transmits a display image signal for non-normal display to the optical modulator corresponding to the light source that is turned on when non-normal display is performed.

In the image display apparatus according to the second aspect, in the non-normal display state, such as a case when any image signal is not being input, the controller performs control to turn off the light sources of colors not used as the light sources that are turned off when non-normal display is performed. Therefore, it is possible to reduce the power consumption of the image display apparatus without making light not used for non-normal display useless. Also, at that time, when a rated power is maintained with respect to the light source that is turned on when non-normal display is performed, it is possible to perform image display while maintaining the brightness of normal display even in the non-normal display.

In the image display apparatus according to the second aspect, it is preferable that the color light sources include a blue light source, a green light source, and a red light source, and when non-normal display is performed, any one of the three color light sources be set as the light source that is turned on when non-normal display is performed. In this case, it is possible to set one-third of all the light sources as the light sources that are turned on when non-normal display is performed while maintaining the brightness of display and to reduce the power consumption of the image display apparatus.

Further, in the image display apparatus according to the second aspect, it is preferable that the controller set display contents of the non-normal display according to determination contents of the signal determining unit. In this case, it is possible to make the user of the image display apparatus recognize what causes the display state to be non-normal.

Furthermore, the image display apparatus according to the second aspect may further include a plurality of air blowers that cool the color light sources. In this structure, it is preferable that the controller separately control the plurality of air blowers in association with turn-on and/or turn-off of the individual color light sources for the non-normal display. In this case, for example, it is possible to send air to only light sources needing to be cooled and thus it is possible to suppress the power consumption of the air blowers while protecting the color light sources from generated heat.

In addition, in the image display apparatus according to the second aspect, it is preferable that, when the signal determining unit cancels the determination that the display state is non-normal, the controller terminate the non-normal display and perform a returning process for returning to a normal operation. In this case, the operation returns from the non-normal display operation to the normal display operation by the returning process Also, in the image display apparatus according to the second aspect, it is preferable that the controller sequentially and circularly set the color light sources one-by-one as the light source that is turned on when non-normal display is performed and the other color light sources as the light sources that are turned off when non-normal display is performed. In this case, it is possible to reduce the number of times that or a period for which each light source is used as the light source that is turned on when non-normal display is performed and thus to extend the life span of the corresponding light source.

Furthermore, in the image display apparatus according to the second aspect, it is preferable that each of the color light sources have a plurality of light emitting elements, and when non-normal display is performed, a portion of the plurality of light emitting elements of the light source that is turned on when non-normal display is performed be turned on. In this case, it is possible to further reduce the power consumption of the image display apparatus.

In addition, the image display apparatus according to the second aspect may further include an illumination optical system that separately uniformizes the light-source light from the color light sources, emits the uniformized light-source light as illumination light, and makes the uniformized light-source light incident on the plurality of optical modulators corresponding to the color light sources, respectively, and a projection optical system that projects image light synthesized through the light synthesizing unit. In this case, it is possible to manufacture a projector as an example of the image display apparatus having the above-mentioned function.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
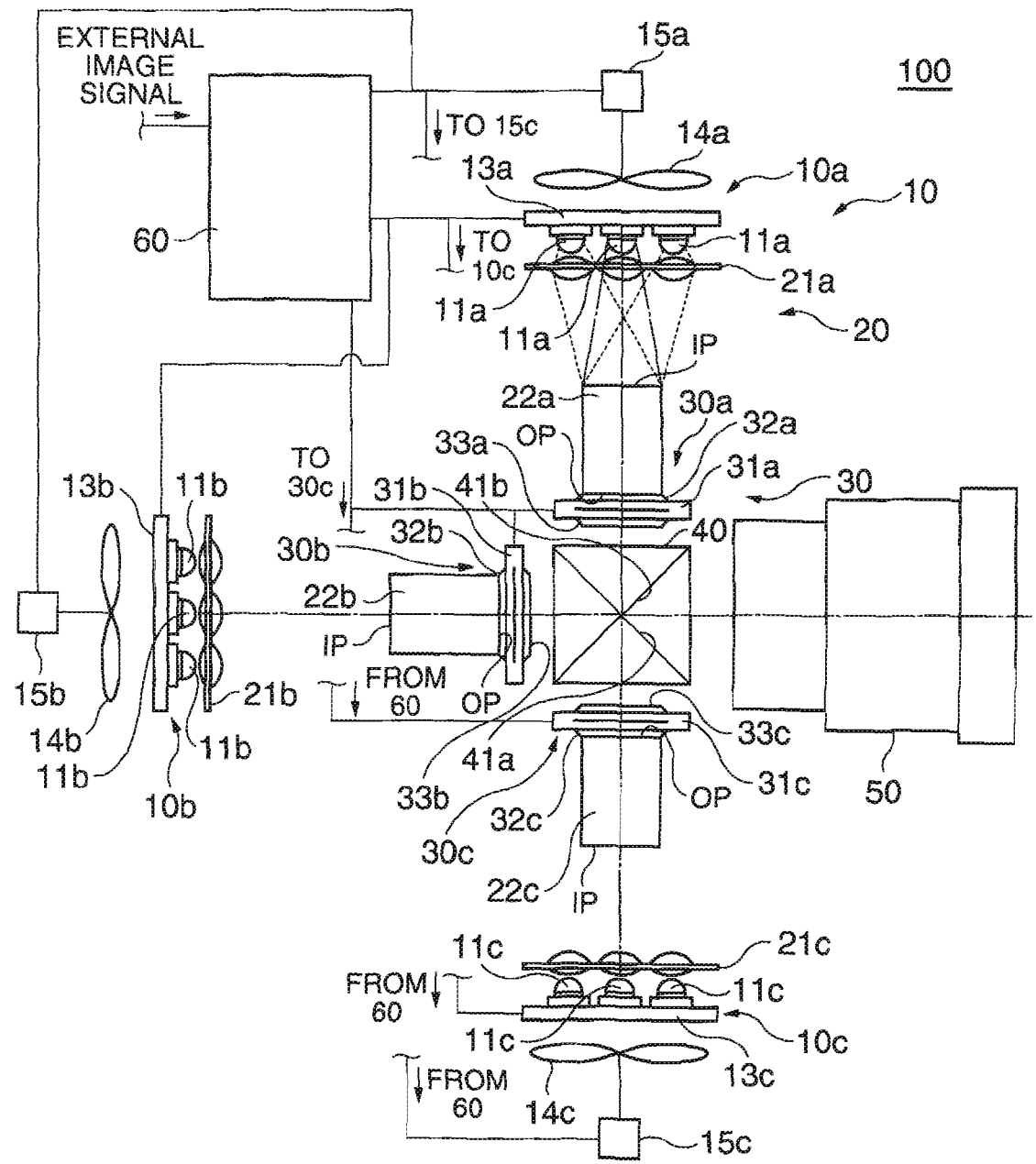
FIG. 1 is a plan view illustrating a projector according to a first embodiment.

FIG. 1 is a block diagram illustrating the structure of a projector 100 that is an example of an image display apparatus according to a first embodiment of the invention. The projector 100 according to the first embodiment includes a light source 10, an illumination optical system 20, an optical modulator 30 serving as a light modulating unit, a cross dichroic prism 40 that is an example of a light synthesizing unit, a projection lens 50 that is a projection optical system, and a controller 60.

The light source 10 has a blue light source 10a, a green light source 10b, and a red light source 10c and generates light-source light of a plurality of colors. The blue light source 10a is formed by organizing a plurality of LED packages 11a each having an LED element as a light emitting element by attaching them to a substrate 13a, serving as a member supporting them, in a two-dimensional arrangement manner. Similarly, the green light source 10b is formed by organizing a plurality of LED packages 11b by attaching them to a substrate 13b. Also, the red light source 10c is formed by organizing a plurality of LED packages 11c by attaching them to a substrate 13c. The color light sources 10a, 10b, and 10c generate color light beams included in categories of three primary colors, that is, blue, green, and red, respectively. On the back sides of the substrates 13a, 13b, and 13c, fans 14a, 14b, and 14c are disposed close to the color light sources 10a, 10b, and 10c as air blowers for cooling the color light sources 10a, 10b, and 10c to correspond to the color light sources 10a, 10b, and 10c. The operation state of each of the color light sources 10a, 10b, and 10c is controlled by a driving signal transmitted as an electrical signal from the controller 60 (which will be described below in detail). Also, the operation states of the fans 14a, 14b, and 14c are controlled by driving signals transmitted as electrical signals from the controller 60 through the drives 15a, 15b, and 15c, respectively.

The illumination optical system 20 includes light condensing lens arrays 21a, 21b, and 21c in which beam shaping lens elements are individually disposed in the front of the LED packages 11a, 11b, and 11c of the color light sources to face the LED packages 11a, 11b, and 11c, and rod integrators 22a, 22b, and 22c serving as light uniformizing units.

Among the color light sources 10a, 10b, and 10c, first, the blue light source 10a will be described. Color light extracted from each LED package 11a of the blue light source 10a passes through the light condensing lens array 21a and is then incident on an incident end, that is, incident port IP of the rod integrator 22a. At this time, the blue light generated by each LED package 11a diverges and is condensed at a predetermined position by each lens element constituting the light condensing lens array 21a so as to become a beam having an elliptical or rectangular section. That is, the blue light from the blue light source 10a is condensed on the rectangular incident port IP provided to the rod integrator 22a as a whole, is incident on the incident port IP in a state in which the blue light overlaps the incident port IP without leakage, passes through the rod integrator 22a, and is emitted from an outgoing end, that is, an outgoing port OP. In this way, a uniform blue light is formed as illumination light, and can uniformly illuminate an irradiated region on a liquid crystal light valve 30a in the next stage.

The green light source 10b and the red light source 10c are the same as the blue light source 10a. That is, green light extracted from each LED package 11b passes through the light condensing lens array 21b and the rod integrator 22b to be uniformized and is emitted in the uniformized state. Also, red light extracted from each LED package 11c passes through the light condensing lens array 21c and the rod integrator 22c to be uniformized and is emitted in the uniformized state.

The optical modulator 30 is composed of three transmissive liquid crystal light valves 30a, 30b, and 30c. Each of the liquid crystal light valves 30a, 30b, and 30c is a non-luminous optical modulator modulating spatial intensity distribution of incident color illumination light. The liquid crystal light valve 30a includes a liquid crystal panel 31a illuminated by the color light emitted from the blue light source 10a, a first polarization filter 32a disposed on the incident side of the liquid crystal panel 31a, and a second polarization filter 33a disposed on the outgoing side of the liquid crystal panel 31a. The liquid crystal light valve 30b includes a liquid crystal panel 31b illuminated by the color light emitted from the green light source 10b, a first polarization filter 32b disposed on the incident side of the liquid crystal panel 31b, and a second polarization filter 33b disposed on the outgoing side of the liquid crystal panel 31b. The liquid crystal light valve 30c includes a liquid crystal panel 31c illuminated by the color light emitted from the red light source 10c, a first polarization filter 32c disposed on the incident side of the liquid crystal panel 31c, and a second polarization filter 33c disposed on the outgoing side of the liquid crystal panel 31c. The polarization state of the color light of three colors incident on the liquid crystal light valves 30a, 30b, and 30c is adjusted for every pixel on the basis of display image signals input as electrical signals from the controller 60 to the liquid crystal panels 31a, 31b, and 31c. At this time, the polarization directions of the illumination light incident on the liquid crystal light valves 30a, 30b, and 30c are adjusted by the first polarization filters 32a, 32b, and 33c, and modulation light having predetermined polarization directions are extracted from the color light emitted from the liquid crystal light valves 30a, 30b, and 30c by the second polarization filters 33a, 33b, and 33c.

The cross dichroic prism 40 synthesizes the blue, green, and red image light from the liquid crystal light valves 30a, 30b, and 30c. More specifically, the cross dichroic prism 40 includes a dielectric multi-layered film 41a for reflecting blue light and a dielectric multi-layered film 41b for reflecting red light perpendicular to each other. In the cross dichroic prism 40, the blue light from the liquid crystal light valve 30a is reflected by the dielectric multi-layered film 41a so as to be emitted toward the left of its traveling direction, the green light from the liquid crystal light valve 30b straight passes through the dielectric multi-layered films 41a and 41b so as to be emitted, and the red light from the liquid crystal light valve 30c is reflected by the dielectric multi-layered film 41b so as to be emitted toward the right of its traveling direction. In this way, the cross dichroic prism 40 synthesizes the red light, the green light, and the blue light so as to form synthesized light as full-color-image light.

The projection lens 50 enlarges the image light by the synthesized light formed through the cross dichroic prism 40 at a desired enlargement ratio and projects a full color image onto a screen (not shown).

The controller 60 receives or detects external image signals by, for example, a video cassette recorder or a personal computer, processes signals to be transmitted to, for example, the color light sources 10a, 10b, and 10c, the fans 14a, 14b, and 14c, or the liquid crystal light valves 30a, 30b, and 30c on the basis of the external image signals and transmits the processed signals, and controls the above-mentioned components.

Figure 2:
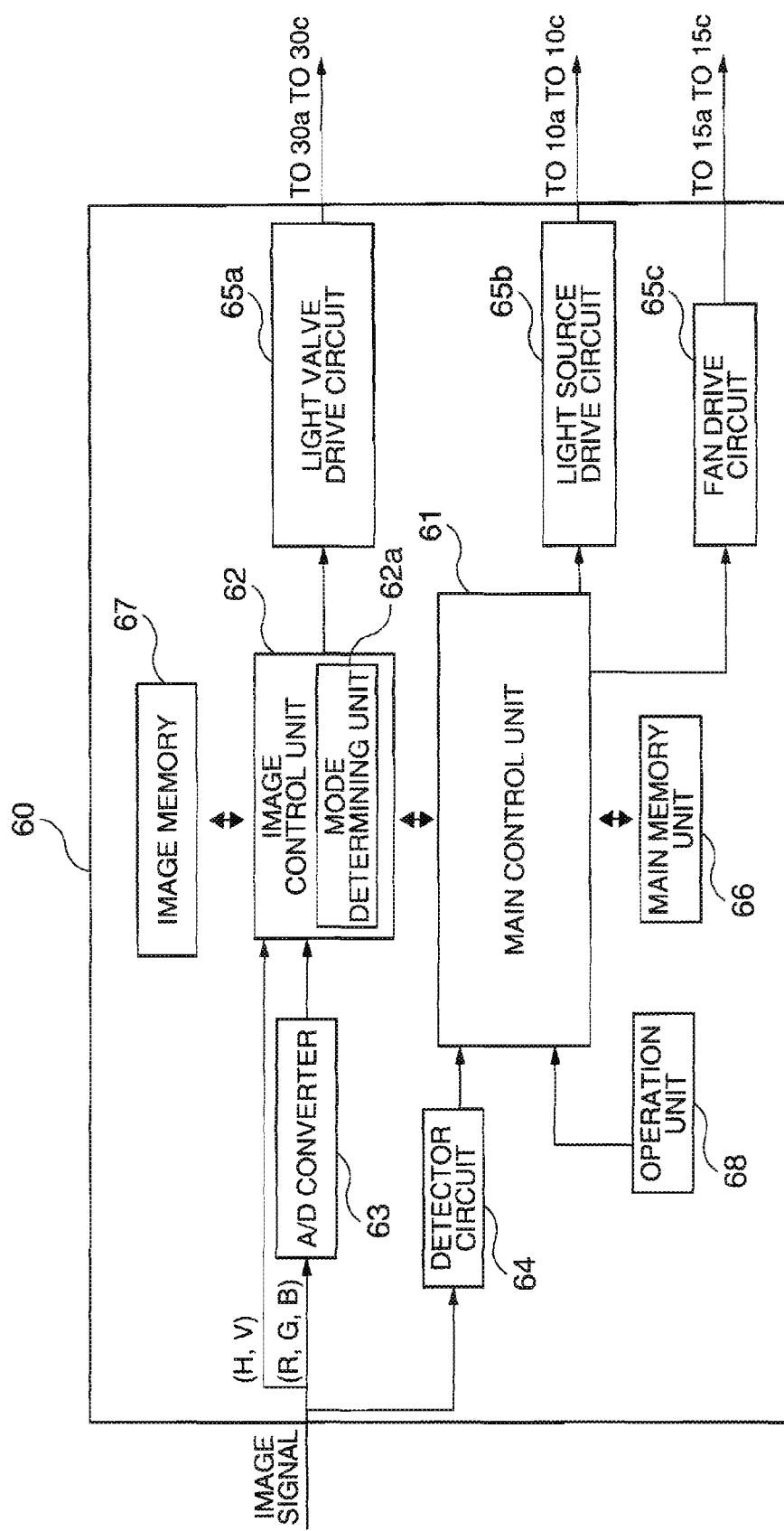
FIG. 2 is a block diagram illustrating the structure of a controller of the projector according to the first embodiment.

FIG. 2 is a block diagram illustrating the structure of the controller 60. In this embodiment, the controller 60 includes a main control unit 61, an image control unit 62, an A/D converter 63, a detector circuit 64, a light valve drive circuit 65a, a light source drive circuit 65b, a fan drive circuit 65c, a main memory unit 66 that is a main memory of the main control unit 61, an image memory 67 that is a main memory of the image control unit 62, and an operation unit 68 receiving an operation instruction signal of a user to the projector 100.

The image control unit 62 performs signal processing for forming a display image signal for a display image from an external image signal. The A/D converter 63 converts the image signal from an analog signal into a digital signal. The detector circuit 64 checks whether the image signal has been input or not. The light valve drive circuit 65a transmits the display image signals having been processed by the image control unit 62 as electrical signals to the liquid crystal light valves 30a, 30b, and 30c. The light source drive circuit 65b transmits driving signals, which have been generated under control of the main control unit 61, to the color light sources 10a, 10b, and 10c shown in FIG. 1. The fan drive circuit 65c transmits driving signals, which have been generated under control of the main control unit 61, to the drives 15a, 15b, and 15c operating the fans 14a, 14b, and 14c shown in FIG. 1.

The image control unit 62 is a display drive unit that controls the operation of the liquid crystal light valves 30a, 30b, and 30c on the basis of the external input image signals to perform display. The image control unit 62 operates the liquid crystal light valves 30a, 30b, and 30c and includes a mode determining unit 62a determining the type of the image signal.

The main control unit 61 determines, as a signal determining unit, whether the image signal has been input on the basis of the output of the detector circuit 64, and whether the image signal can be processed by the liquid crystal light valves 30a, 30b, and 30c on the basis of the determination of the mode determining unit 62a. As the result of the determination, when the image signal has not been input or when the image signal cannot be processed by the image control unit 62, the main control unit 61 determines that a display state is non-normal.

On the basis of the result of the determination with respect to whether the image signal has been input or whether the image signal can be processed, the main control unit 61 transmits a signal for controlling the operation of the liquid crystal light valves 30a, 30b, and 30c shown in FIG. 1 through the image control unit 62, and transmits signals for operating the color light sources 10a, 10b, and 10c and the drives 15a, 15b, and 15c shown in FIG. 1 to the color light sources 10a, 10b, and 10c and the drives 15a, 15b, and 15c. The operation in the determination and the transmission of the various signals will now be described in detail.

When the image signal is input to the controller 60, first, the detector circuit 64 checks whether the image signal has been input and transmits the check result to the main control unit 61. Also, a vertical sync signal is separated from the image signal and is transmitted to the image control unit 62. When the image signal is an analog signal, the A/D converter 63 converts the image signal into a digital signal. For example, when the image signal is an analog full-color-image signal, the A/D converter 63 converts the analog-type full-color-image signal into a digital image signal and transmits the digital image signal to the image control unit 62. The image control unit 62 processes the digital image signal.

In this procedure, the analog image data of the full-color-image signal is converted into digital image data having a predetermined number of tone levels, and image signals and driving signals, which are display image signals to be transmitted to the liquid crystal light valves 30a, 30b, and 30c, are formed. The formed driving signals and the image signals to be formed are transmitted as electrical signals to the liquid crystal light valves 30a, 30b, and 30c shown in FIG. 1 through the light valve drive circuit 65a. According to, for example, the process of the image control unit 62, the main control unit 61 performs processing of the signals to be transmitted to the color light sources 10a, 10b, and 10c and the fans 14a, 14b, and 14c shown in FIG. 1 in order to properly operate the color light sources 10a, 10b, and 10c and the fans 14a, 14b, and 14c. That is, the driving signals formed in the main control unit 61 are transmitted to the color light sources 10a, 10b, and 10c through the light source drive circuit 65b and to the drivers 15a, 15b, and 15c through the fan drive circuit 65c. According to the above-mentioned signal output, the liquid crystal light valves 30a, 30b, and 30c, the color light sources 10a, 10b, and 10c, and the drivers 15a, 15b, and 15c harmoniously operate in order to form a display image. In this way, image display by projection of the projector 100 shown in FIG. 1 onto the screen is performed.

Now, an outline of the characteristic operation of the controller 60 will be described. As described above, the mode determining unit 62a of the image control unit 62 shown in FIG. 2 determines the type of the image signal which becomes a criterion to determine whether the image signal transmitted to the image control unit 62 can be processed by the image control unit 62. The main control unit 61 determines whether non-normal display is performed or not on the basis of the determination of the detector circuit 64 with respect to whether the image signal has been input and the determination of the mode determining unit 62a.

When it is determined that normal display can be performed, the above-described normal image display is performed. Meanwhile, when it is determined that non-normal display is performed (non-normal display state), a process for non-normal display is performed. Hereinafter, the detailed operation in the non-normal display state will be described. First, the main control unit 61 transmits the various driving signal to the color light sources 10a, 10b, and 10c shown in FIG. 1 through the light source drive circuit 65b. At this time, for example, the driving signals turn on the blue light source 10a, serving as a light source that are turned on when normal display is performed, of the color light sources 10a, 10b, and 10c and turn off the remaining green and red light sources 10b and 10c serving as light sources that are turned on when non-normal display is performed. That is, only the blue light selected as a specific color is generated. Also, the main control unit 61 transmits the driving signals according to which light sources are turned on to the drives 15a, 15b, and 15c through the fan drive circuit 65c. That is, the main control unit transmits the driving signal for maintaining the number of rotation of the fan 14a through the drive 15a corresponding to the blue light source 10a, that is, the light source that is turned on when the normal display is performed, and reducing the number of rotation or stopping the rotation of each of the fans 14b and 14c through the drives 15b and 15c corresponding to the light sources that are turned off when non-normal display is performed.

Further, at this times under control of the main control unit 61, the image control unit 62 transmits, as an electrical signal, a display image signal for performing display exhibiting the non-normal display state on a portion of the image display screen to the liquid crystal light valve 30a through the light valve drive circuit 65a. Specifically, for example, some of pixels disposed on the liquid crystal panel 31a are shielded against light by the corresponding signal transmitted to the liquid crystal light valve 30a shown in FIG. 1. Therefore, black display is performed at the parts, corresponding to the shielded pixels, on the screen where the projected image is displayed. In this case, for example, when light is transmitted at only parts for displaying characters, on the image display screen, the background is displayed in black and the characters by blue light are read such that it is recognized that non-normal display is performed. Alternatively, as a non-normal display method, contrary to the above example, it is possible to shield only the parts for displaying the characters against light such that it is displayed without black that non-normal display is performed. Also, non-normal display is not limited to display by characters but may be, for example, a mark.

Figure 3:
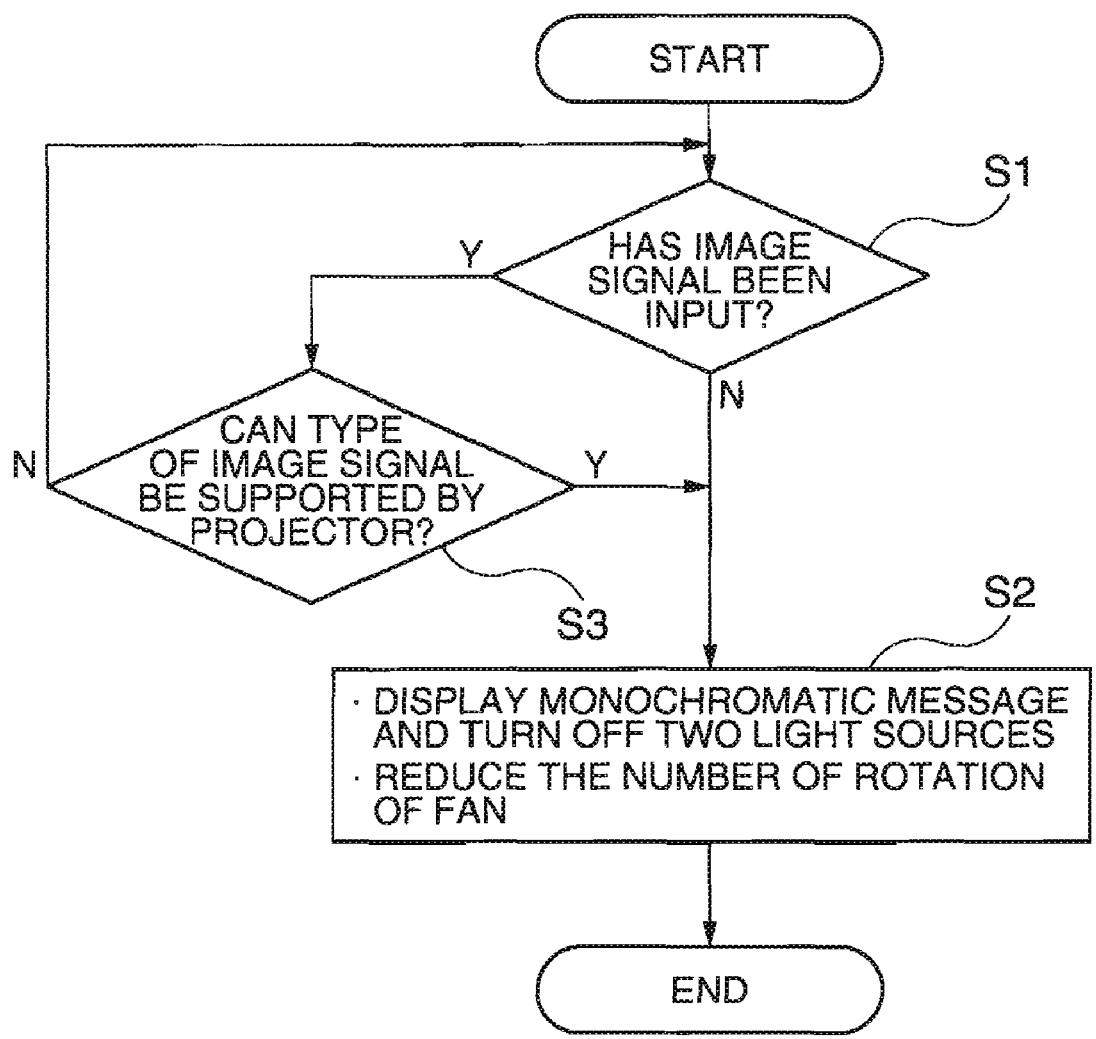
FIG. 3 is a flow chart representing a sequence of operations when non-normal display is performed.

FIG. 3 is a flow chart representing a sequence of operations when non-normal display is performed by the determination of the mode determining unit 62a and the determination of the main control unit 61 based on the determination of the mode determining unit 62a.

In the controller 60, from whether an image signal from the detector circuit 64 has been input, whether the image signal has been input is determined by the main control unit 61 (Step S1). As a result, when it is determined that any image signal input has not been confirmed (that is, an image signal has not been input) a monochromatic message representing non-normal display is displayed. At this time, a process for turning off the two color light sources (the blue and red light sources in this embodiment), which are the light sources turned off when non-normal display is performed, is performed, and a process for reducing the number of rotation of each of the fans corresponding to the two color light sources (the blue and red light sources in this embodiment), which are the light sources turned off when non-normal display is performed, is performed (Step S2).

Meanwhile, when it is determined in Step S1 by the main control unit 61 that image signal input has been confirmed, the type of the input image signal is read by the determination of the mode determining unit 62a of the image control unit 62 shown in FIG. 2. On the basis of the determination of the mode determining unit, the main control unit 61 determines whether the type of the image signal can be supported by the projector 100 so as to perform image output (Step S3). When it is determined that the processing of the type of the image signal cannot be supported, the procedure proceeds to Step S2, in which the process for non-normal display is performed.

For example, types representing resolutions, such as VGA and XGA, and video signal methods, such as NTSC and PAL, can be considered as the type of the image signals read in Step S3. Any kind of type from which it can be determined whether the image signal can be processed by the projector 100 may be used.

Figure 4:
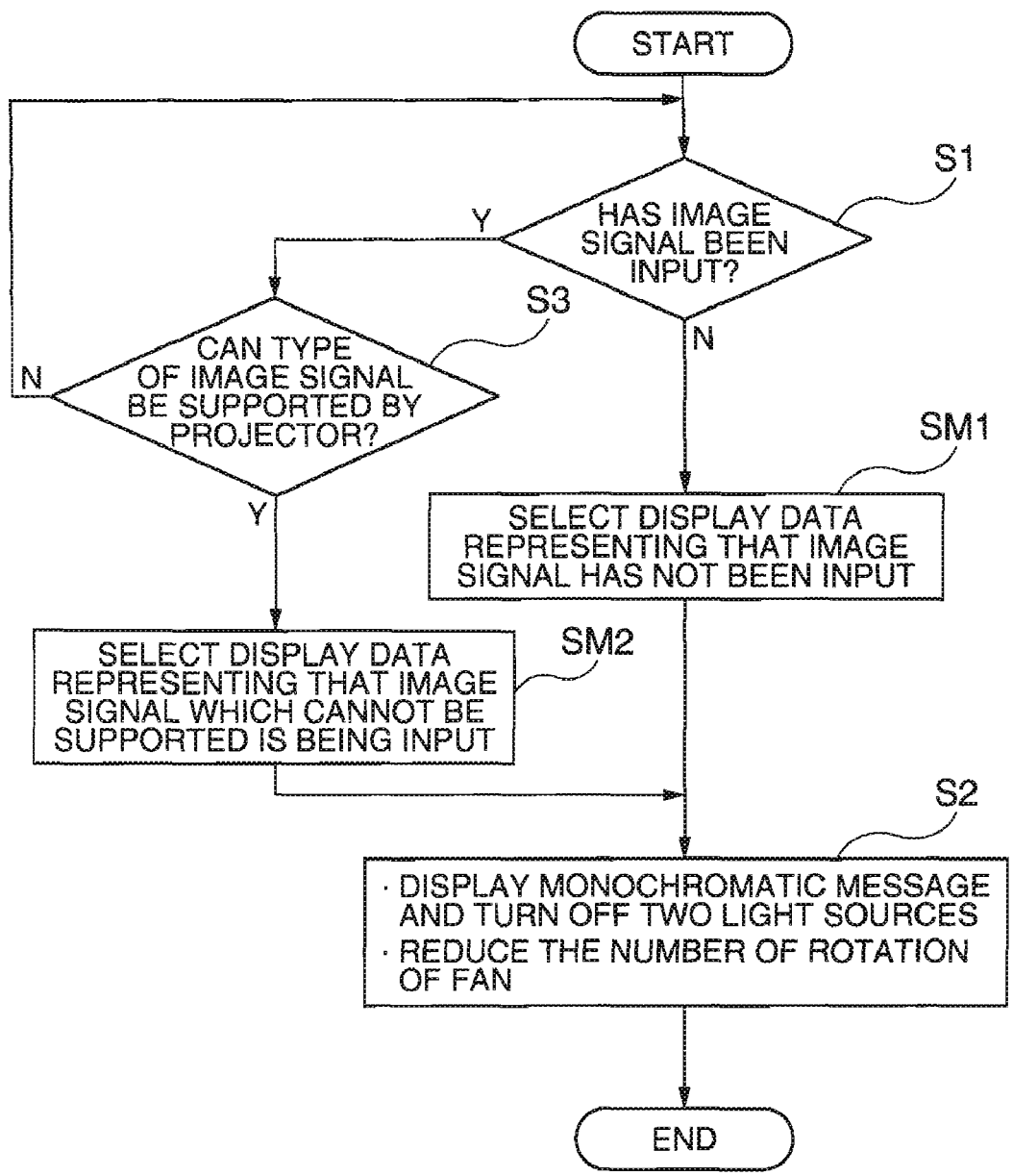
FIG. 4 is a flow chart representing a sequence of operations when non-normal display according to display contents is performed.

Further, when it is determined in Step 1 that any image signal has not been input and when it is determined in Step S3 that the type of the image signal cannot be supported, the contents of the monochromatic message displayed in Step S2 may be changed. FIG. 4 is a flow chart representing a sequence of operations when non-normal display according to display contents is performed. As shown in FIG. 4, when it is determined in Step S1 shown in FIG. 3 that any image signal has not been input, the image control unit 62 selects display data representing that any image signal has not been input from display data stored in the image memory 67 as the characters when non-normal display is performed (Step SM1). Meanwhile, when it is determined in Step S3 that the type of the image signal cannot be supported, the image control unit 62 selects display data representing that a signal that cannot be not supported is being input (Step SM2). Therefore, in the non-normal display, a message according to error contents can be displayed. That is, in this case, it is possible to control the display contents according to the contents of the determination of the controller 60 with respect to image display.

Figure 5:
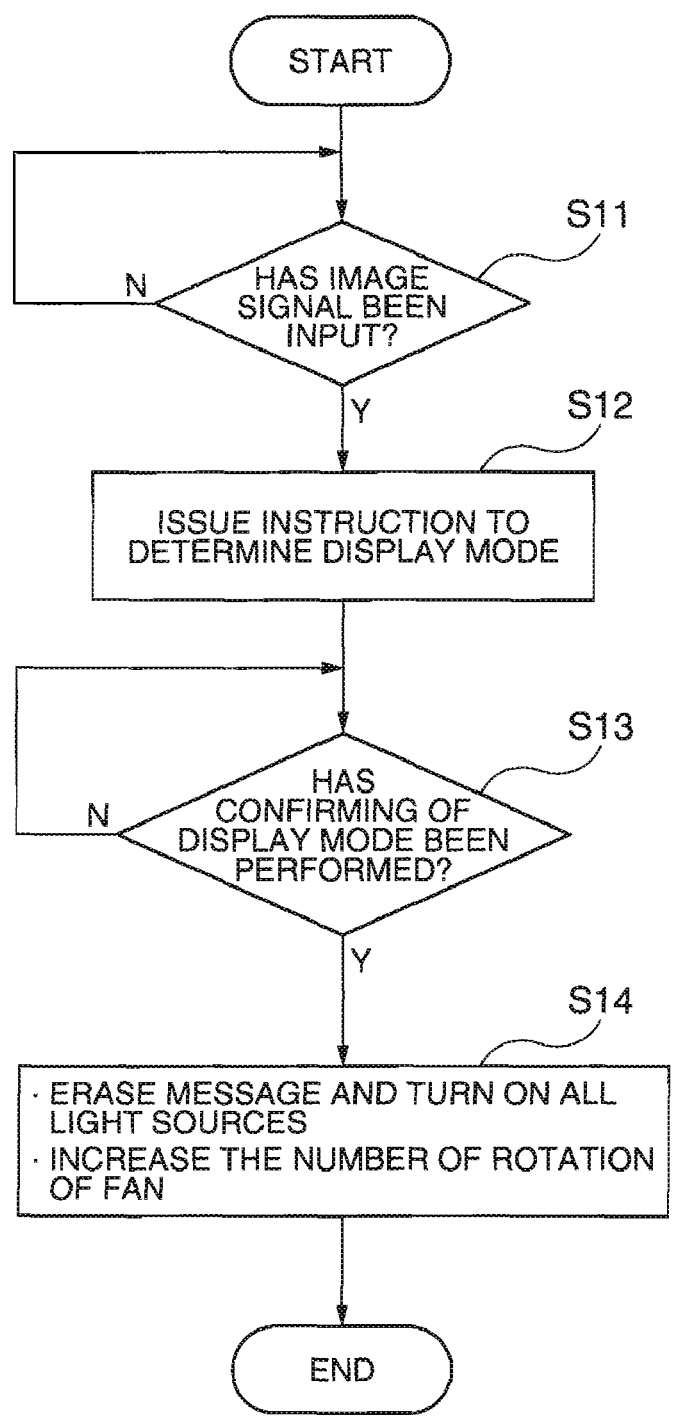
FIG. 5 is a flow chart representing a sequence of operations when the display operation returns from non-normal display to normal display.

FIG. 5 is a flow chart representing a sequence of operations of the controller 60 for performing return processing for terminating the non-normal display and returning to the normal operation when the determination that the display state is non-normal is canceled by the main controller 61. First, whether an image signal has been input and whether the image signal can be supported by the projector 100 to perform image output are determined by the main control unit 61 and the mode determining unit 62a of the image control unit 62 shown in FIG. 2 (Step S11). When it is determined that image signal input is confirmed and the type of the image signal can be supported, the main control unit 61 and the image control unit 62 performs processing for issuing an instruction to determine a display mode (Step S12). That is, an instruction is issued to cope with various signal processes according to the kind of signal being supported and determined by the mode determining unit 62a. Next, confirming of the display mode is performed (Step S13). That is, the main control unit 61 confirms whether process preparation for coping with the corresponding signal process is made. When the display mode is confirmed in Step S13, under control of the main control unit 61, processes for transmitting necessary signals to the liquid crystal light valves 30a, 30b, and 30c, the color light sources 10a, 10b, and 10c, and the fans 14a, 14b, and 14c shown in FIG. 1, erasing the massage in the non-normal display, turning on all the light sources, and increasing the number of rotation of each of the fans are performed (Step S14). In this way, the operation of the projector 100 can return to the normal operation.

In the above description, when non-normal display is performed, among the color light sources 10a, 10b, and 10c shown in FIG. 1, the blue light source 10a is turned on as a light source that is turned on when non-normal display is performed, and the remaining green and red light sources 10b and 10c are turned off as light sources that are turned off when non-normal display is performed. However, this embodiment is not limited thereto. For example, as a light source that is turned on when non-normal display is performed, instead of the blue light source 10a, any of the other color light sources 10b and 10c may be used. Alternatively, any two color light sources may be used as light sources that are turned on when non-normal display is performed and the remaining one color light source may be used as a light source that is turned off when non-normal display is performed.

Figure 6:
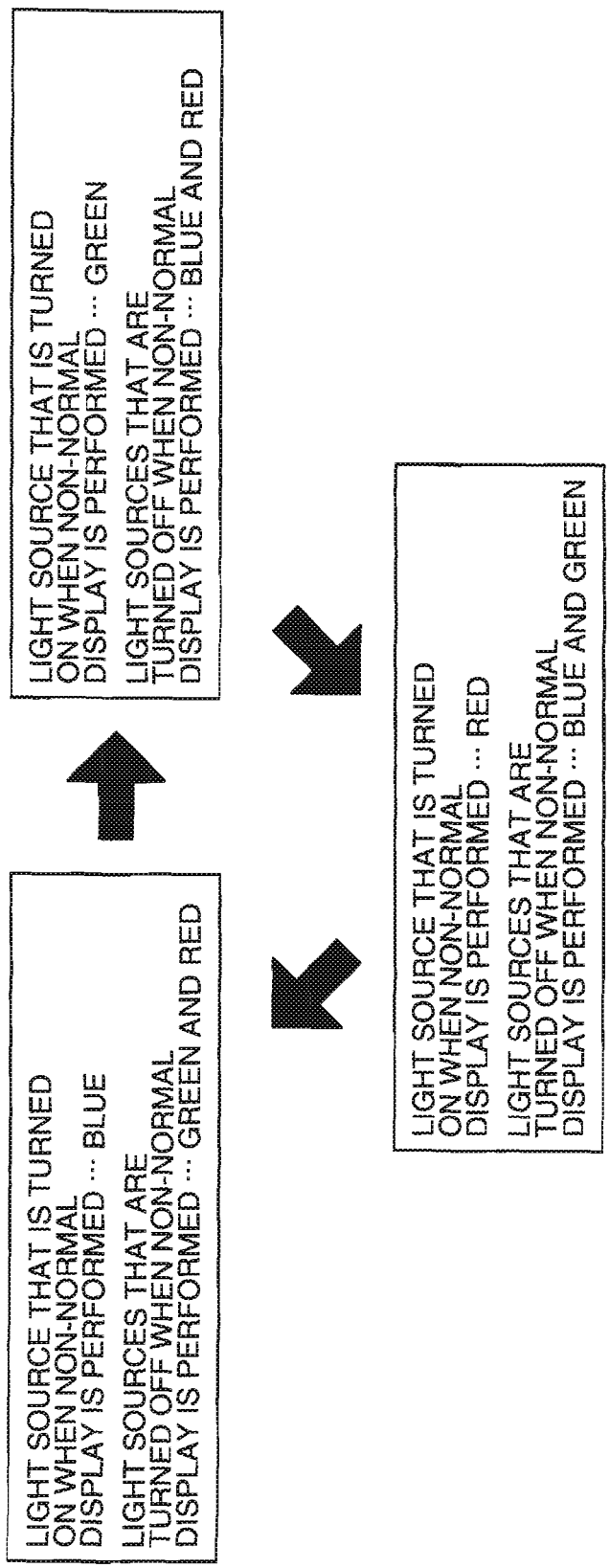
FIG. 6 is a view illustrating a case when individual color light sources are used in a cycle.

Also, it is possible to sequentially and circularly set the color light sources 10a, 10b, and 10c one-by-one as the light source that is turned on when non-normal display is performed and the other color light sources as the light sources that are turned off when non-normal display is performed, as shown in FIG. 6. That is, as the monochromatic massage for the non-normal display, for example, it is possible that, whenever the projector 100 is turned on, the blue, green, and red light sources are sequentially set in that order as the light source, which is turned on when non-normal display is performed, used in the non-normal display. In this case, it is possible that a register is provided to the controller 60 such that, whenever a predetermined number of times the light source that is turned on when non-normal display is performed is used are counted, the light source, which is turned on when non-normal display is performed, is changed. Alternatively, it is possible that a timer is provided to the controller 60 such that the light source, which is turned on when non-normal display is performed, is changed at predetermined time intervals.

Figure 7:
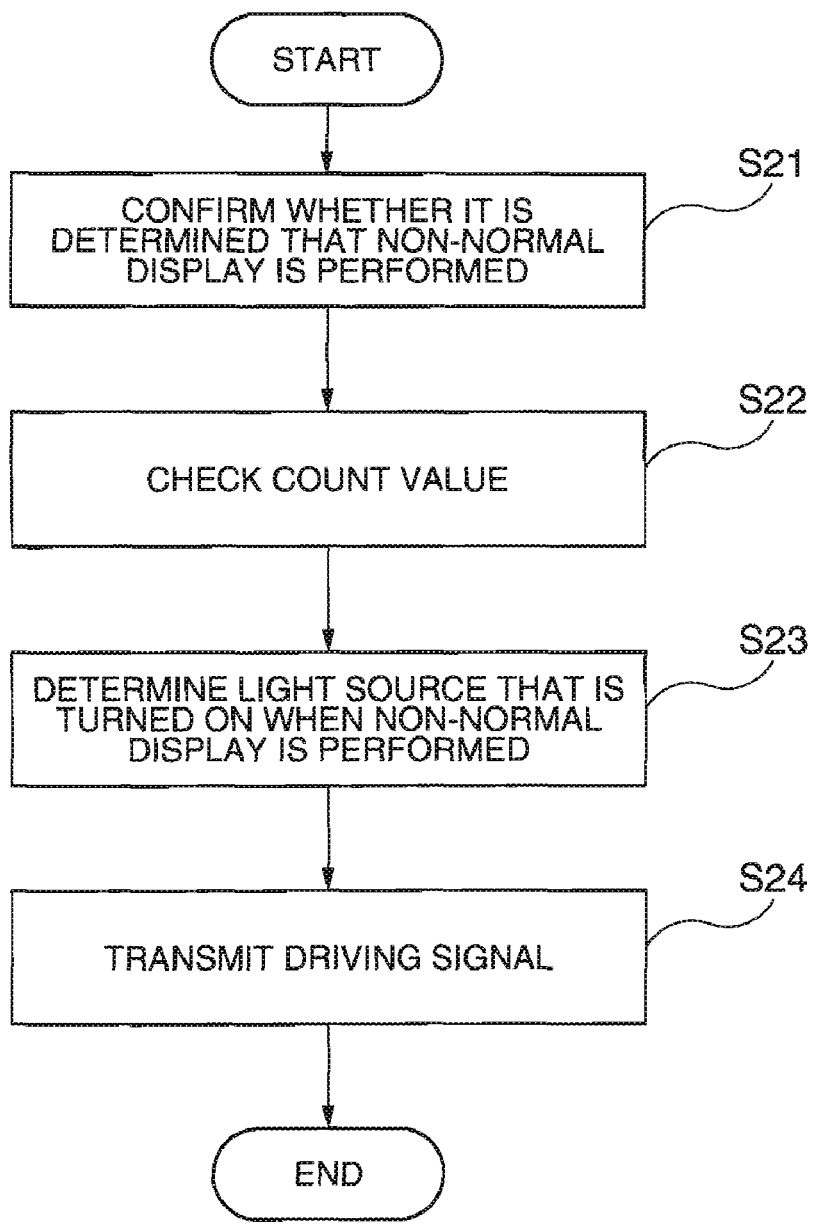
FIG. 7 is a flow chart illustrating the cycle of a light source that is turned on when non-normal display is performed.

FIG. 7 is a flow chart illustrating a case of providing the controller 60 shown in FIG. 1 with a register for counting the number of times the light source, which is turned on when non-normal display is performed, is used, as an example of a process of the cycle of the light source, which is turned on when non-normal display is performed, used in the non-normal display. First, the main control unit 61 of the controller 60 shown in FIG. 2 confirms whether it is determined that non-normal display is performed by the determining processes in Step Si or Step S3 shown in FIG. 3 (Step S21). When the confirmation is performed, the main control unit 61 checks a count value of the register (Step S22). When the count value reaches the predetermined number of times, the main control unit 61 clears the count value and performs a process of changing the light source that is turned on when non-normal display is performed. Meanwhile, when the count value does not reach the predetermined number of times, the main control unit increases the count value by 1 and performs a process of not changing the light source that is turned on when non-normal display is performed. In this way, it is determined the color light source to be used as the light source that is turned on when non-normal display is performed (Step S23). When the color light source to be used as the light source that is turned on when non-normal display is performed and the color light sources to be used as the light sources that is turned off when non-normal display is performed are determined in Step S23, under control of the main control unit 61, driving signals are transmitted to the color light sources 10a, 10b, and 10c through the light source drive circuit 65b (Step S24) When the above-mentioned operations are repeated, in Step S23, the color light sources 10a, 10b, and 10c each used as the light source that is turned on when non-normal display is performed are sequentially changed in a circle as shown in FIG. 6 whenever the number of usage times thereof as the light source that is turned on when non-normal display is performed reaches the predetermined number of times.

The change cycle does not need to be equal for every color and may be changed according to the life span of each color light source. That is, for example, when the life span of the red light source 10c is shorter than those of the other two color light sources, the number of times the red light source 10c is used as the light source that is turned on when non-normal display is performed may be set smaller than in the blue light source 10a and the green light source 10b. Alternatively, the red light source 10c having the smaller life span may be always used as the light source that is turned off when non-normal display is performed and the blue light source 10a and the green light source 10b may be sequentially used in a circle as the light source that is turned on when non-normal display is performed.

Also, it is possible to turn on a portion of the plurality of LED packages included in a color light source (for example, the blue light source 10a) used as the light source that is turned on when non-normal display is performed and to turn off the remaining LED packages. That is, it is possible to turn on only a portion of the plurality of LED packages 11a included in the blue light source 10a shown in FIG. 1 and to turn off the remaining LED packages 11a together with the other color light sources 10b and 10c. In this way, it is possible to further reduce the power consumption. Further, in this case, it is also possible to reduce the number of rotation of the fan 14a corresponding to the blue light source 10a depending on the number of the LED packages 11a turned off.

This invention is not limited to the above-mentioned embodiment but can be variously embodied without departing from the scope of the invention. For example, this invention can be modified as follows.

In the above-mentioned embodiment, an example of a case when the invention is applied to the transmissive-type projector has been described. However, this invention can be applied to a reflective-type projector. Here, 'transmissive-type' means a type in which an optical modulator including a liquid crystal panel and so on transmits light and 'reflective-type' means a type in which an optical modulator reflects light.

Also, in the above-mentioned embodiment, the light condensing lens array 21a, 21b, and 21c and the rod integrators 22a, 22b, and 22c serving as light uniformizing units are used as the illumination optical system 20. However, in the illumination optical system 20, instead of them, various systems according to the light sources can be used as an optical system for light uniformization. For example, a pair of fly-eye lenses may be used as the optical system for light uniformization.

Further, in the light sources 10 of this embodiment, the LED elements are used as light emitting elements. It is preferable to provide the light sources 10 of the individual colors independently of one another. Further, instead of the LED elements, other elements, such as EL elements can be used. A three-pipe-type projector can be considered as an image display apparatus provided with light sources of individual colors independently of one another, and can have the same structure as that according to the embodiment of the invention. Furthermore, the invention is not limited to projectors and the same structure as that according to the embodiment of the invention can be applied to various image display apparatuses each provided with light sources of individual colors independently of one another.

The entire disclosure of Japanese Patent Application No. 200688301, filed Mar. 28, 2006 is expressly incorporated by reference herein.

What is claimed is:

1. An image display apparatus comprising:
   a light source that generates light-source light of a plurality of colors;
   at least one optical modulator that modulates each of the light-source light generated by the light source to image light;
   a display drive unit that controls the optical modulator to perform display according to an input image signal;
   a signal determining unit that determines whether the image signal has been input and whether the image signal can be processed by the display drive unit, and determines that a display state is non-normal when the image signal has not been input or when the image signal cannot be processed by the display drive unit; and
   a controller that, when the signal determining unit determines that the display state is non-normal, controls the light source to generates only one specific color light of the plurality of colors and simultaneously transmits a display image signal for non-normal display to the optical modulator.

2. An image display apparatus comprising:
   a plurality of color light sources that generate light-source light of a plurality of colors, respectively;
   a plurality of optical modulators that correspond to the respective color light sources and modulate each light-source light generated by the plurality of color light sources to image light of the individual colors;
   a light synthesizing unit that synthesizes the image light of the individual colors respectively modulated by the plurality of optical modulators;
   a display drive unit that controls the optical modulators to perform display according to an input image signal;
   a signal determining unit that determines whether the image signal has been input and whether the image signal can be processed by the display drive unit, and determines that a display state is non-normal when the image signal has not been input or when the image signal cannot be processed by the display drive unit; and
   a controller that, when the signal determining unit determines that the display state is non-normal, turns on at least one of the color light sources as a light source that is turned on when non-normal display is performed, turns off the remaining color light sources as light sources that are turned off when non-normal display is performed, and transmits a display image signal for non-normal display to the optical modulator corresponding to the light source that is turned on when non-normal display is performed.

3. The image display apparatus according to claim 2, wherein the color light sources include a blue light source, a green light source, and a red light source, and when non-normal display is performed, one of the three color light sources is set as the light source that is turned on when non-normal display is performed.

4. The image display apparatus according to claim 2, wherein the controller sets display contents of the non-normal display according to determination contents of the signal determining unit.

5. The image display apparatus according to claim 2, further comprising
   a plurality of air blowers that cool the color light sources,
   wherein the controller separately controls the plurality of air blowers in association with turn-on and/or turn-off of the respective color light sources for the non-normal display.

6. The image display apparatus according to claim 2, wherein, when the signal determining unit cancels the determination that the display state is non-normal, the controller terminates the non-normal display and performs a returning process for returning to a normal operation.

7. The image display apparatus according to claim 2, wherein the controller sequentially and circularly sets the color light sources one-by-one as the light source that is turned on when non-normal display is performed and the other color light sources as the light sources that are turned off when non-normal display is performed.

8. The image display apparatus according to claim 2, wherein each of the color light sources has a plurality of light emitting elements, and when non-normal display is performed, a portion of the plurality of light emitting elements of the light source that is turned on when non-normal display is performed is turned on.

9. The image display apparatus according to claim 2, further comprising
   an illumination optical system that separately uniformizes the light-source light from the color light sources, emits the uniformized light-source light as illumination light, and makes the uniformized light-source light incident on the plurality of optical modulators corresponding to the color light sources, respectively, and
   a projection optical system that projects image light synthesized by the light synthesizing unit.

* * * * *